United States Patent
Haynes et al.

(10) Patent No.: US 11,731,771 B2
(45) Date of Patent: Aug. 22, 2023

(54) YOKE STRAP WITH SHOCK ABSORBER

(71) Applicant: GOODRICH CORPORATION, Charlotte, NC (US)

(72) Inventors: Timothy C. Haynes, Prescott Valley, AZ (US); Daniel Bahena, Phoenix, AZ (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 17/561,344

(22) Filed: Dec. 23, 2021

(65) Prior Publication Data

US 2022/0119118 A1 Apr. 21, 2022

Related U.S. Application Data

(60) Continuation of application No. 16/831,316, filed on Mar. 26, 2020, now Pat. No. 11,242,154, which is a division of application No. 15/498,825, filed on Apr. 27, 2017, now Pat. No. 10,647,436.

(51) Int. Cl.
*B64D 25/14* (2006.01)
*B63B 27/14* (2006.01)

(52) U.S. Cl.
CPC ........ *B64D 25/14* (2013.01); *B63B 2027/145* (2013.01)

(58) Field of Classification Search
CPC ..... B64D 25/14; B63B 2027/145; A62B 3/00; A62B 1/20; Y10S 244/905
See application file for complete search history.

(56) References Cited

U.S. PATENT DOCUMENTS

| | | |
|---|---|---|
| 3,534,418 A | 10/1970 | Adams, Jr. |
| 3,897,861 A | 8/1975 | Miller |
| 3,944,023 A | 3/1976 | Fisher |
| 3,973,645 A | 8/1976 | Dix |
| 4,526,262 A | 7/1985 | Malcolm |
| 4,567,977 A | 2/1986 | Fisher |
| 5,487,444 A | 1/1996 | Dennington |
| 5,871,180 A | 2/1999 | Hublikar |
| 5,906,340 A | 5/1999 | Duggal |
| 9,296,484 B2 | 3/2016 | Biro |
| 9,725,181 B2 | 8/2017 | Evans |

(Continued)

FOREIGN PATENT DOCUMENTS

| | | |
|---|---|---|
| EP | 0096594 | 12/1983 |
| EP | 0884240 | 12/1998 |

(Continued)

OTHER PUBLICATIONS

USPTO; Restriction Requirement Office Action dated Jun. 24, 2019 in U.S. Appl. No. 15/498,825.

(Continued)

*Primary Examiner* — Benjamin P Lee
(74) *Attorney, Agent, or Firm* — Snell & Wilmer L.L.P.

(57) ABSTRACT

A restraint arrangement for an inflatable slide may comprise a releasable restraint and a yoke coupled to the releasable restraint. The yoke may comprise a first strap and a second strap. A first dampener may be coupled to the first strap. A second dampener may be coupled to the second strap. The first dampener and the second dampener may deform in response to a tensile load.

9 Claims, 8 Drawing Sheets

(56) References Cited

U.S. PATENT DOCUMENTS

| | | | |
|---|---|---|---|
| 10,214,132 B2 | 2/2019 | Wang et al. | |
| 10,486,818 B2 | 11/2019 | Volny | |
| 1,049,411 A1 | 12/2019 | Haynes | |
| 10,494,110 B2 * | 12/2019 | Haynes | B65D 63/1081 |
| 10,556,697 B2 | 2/2020 | Haynes | |
| 2018/0201380 A1 * | 7/2018 | Haynes | B64D 25/14 |
| 2018/0201381 A1 * | 7/2018 | Volny | B64D 25/14 |
| 2018/0273189 A1 * | 9/2018 | Haynes | B64D 25/14 |
| 2018/0327101 A1 * | 11/2018 | Haynes | B64D 25/14 |
| 2018/0334256 A1 * | 11/2018 | Haynes | B64D 25/14 |
| 2019/0112059 A1 * | 4/2019 | Haynes | B64D 25/14 |
| 2019/0202571 A1 * | 7/2019 | Haynes | B64D 25/14 |
| 2021/0053661 A1 * | 2/2021 | Haynes | B63C 9/04 |

FOREIGN PATENT DOCUMENTS

| | | | | |
|---|---|---|---|---|
| EP | 0884240 | A2 * | 12/1998 | |
| EP | 0893343 | | 1/1999 | |
| EP | 0893343 | A2 * | 1/1999 | B64D 25/14 |
| EP | 2572994 | | 3/2013 | |
| EP | 3348481 | | 7/2018 | |
| EP | 3348481 | A1 * | 7/2018 | A62B 1/20 |
| EP | 3378756 | | 9/2018 | |
| EP | 3378756 | A1 * | 9/2018 | B63C 9/22 |
| EP | 3378779 | | 9/2018 | |
| EP | 3378779 | A1 * | 9/2018 | B63B 27/14 |
| EP | 3403930 | | 11/2018 | |
| EP | 3403930 | A1 * | 11/2018 | B64D 25/14 |
| GB | 535826 | | 4/1941 | |
| JP | S5861090 | | 4/1983 | |

OTHER PUBLICATIONS

USPTO; Non-Final Office Action dated Sep. 12, 2019 in U.S. Appl. No. 15/498,825.

USPTO; Notice of Allowance dated Dec. 31, 2019 in U.S. Appl. No. 15/498,825.

European Patent Office, European Search Report dated Jul. 9, 2018 in Application No. 18169354.0-1010.

USPTO; Non-Final Office Action dated Mar. 17, 2021 in U.S. Appl. No. 16/831,316.

USPTO; Notice of Allowance dated Sep. 29, 2021 in U.S. Appl. No. 16/831,316.

* cited by examiner

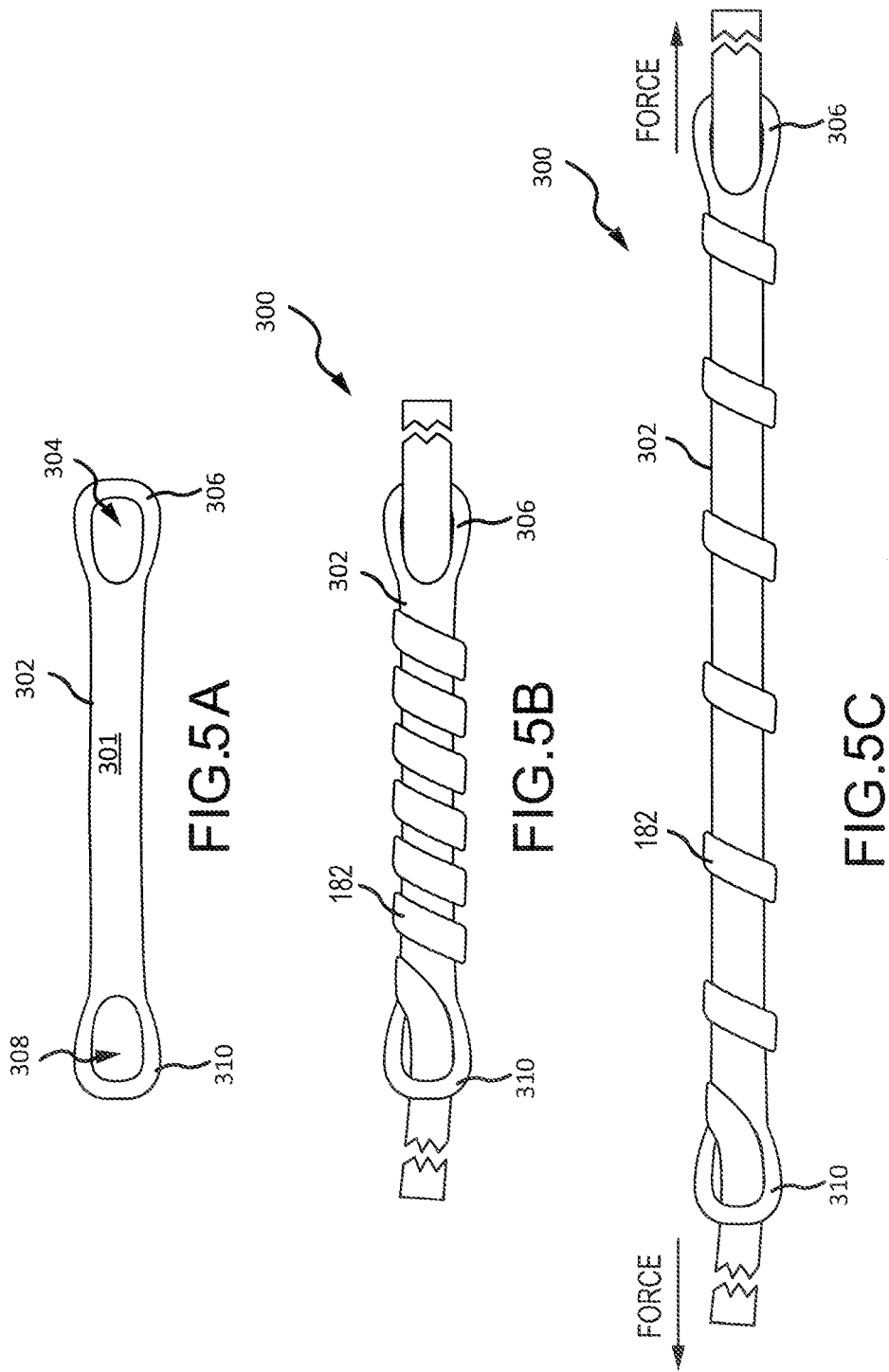

YOKE STRAP WITH SHOCK ABSORBER

CROSS-REFERENCE TO RELATED APPLICATIONS

This application is a Continuation of, and claims priority to and the benefit of, U.S. application Ser. No. 16/831,316 filed Mar. 26, 2020 and entitled "YOKE STRAP WITH SHOCK ABSORBER," which is a divisional of, and claims priority to and the benefit of, U.S. application Ser. No. 15/498,825, filed Apr. 27, 2017 and entitled "YOKE STRAP WITH SHOCK ABSORBER," now U.S. Pat. No. 10,647,436 issued May 12, 2020. All the aforementioned applications are hereby incorporated by reference in their entirety for all purposes.

FIELD

The present disclosure relates to aircraft evacuation assemblies, and more specifically to restraint devices for evacuation slides and methods of making an evacuation assembly.

BACKGROUND

An evacuation slide assembly may include an inflatable slide that helps passengers disembark from an aircraft in the event of an emergency or other evacuation event. The slides may deploy from a door sill or a side of the aircraft fuselage. The slide deployment is controlled by restraints placed throughout the length of the slide which release in stages in response to internal slide pressure. At an initiation of inflation, the slide may drop from the door sill creating an impulse on the primary restraint (i.e., the first restraint to release in a staged deployment of the evacuation slide). The impulse created by the dropping of the slide may cause the primary restraint to separate prematurely, which can lead to a less than full extension of the evacuation slide and/or an incorrect orientation of a head end of the evacuation slide.

SUMMARY

Disclosed herein, according to various embodiments, is a restraint arrangement for an inflatable slide. A restraint arrangement for an inflatable slide may comprise a releasable restraint. A yoke may be coupled to the releasable restraint. The yoke may comprise a first strap and a second strap. A first dampener may be coupled to the first strap. A second dampener may be coupled to the second strap.

In various embodiments, the first dampener and the second dampener may comprise an elastic material and may deform in response to a tensile load. The tensile load may be generated by a dropping of the inflatable slide.

In various embodiments, the first dampener may be coupled between a first portion of the first strap and a second portion of the first strap, and the second dampener may be coupled between a first portion of the second strap and a second portion of the second strap. A third strap may be coupled between the first portion of the first strap and the second portion of the first strap. The first strap may be wrapped around the first dampener. The first dampener may comprise a plurality of openings and the first strap may be threaded through the plurality of openings.

In various embodiments, the first dampener may comprise at least one of a central aperture dampener, a semi-circular dampener, a wraparound dampener, a threaded dampener, or a spring dampener. The second dampener may comprise at least one of a wraparound dampener, a threaded dampener, a semi-circular dampener, or a spring dampener.

In various embodiments, a yoke for an evacuation system is disclosed. A yoke for an evacuation system may comprise a first strap, a second strap, and a first dampener coupled to the first strap.

In various embodiments, the first dampener may comprise an elastic material and may be configured to deform in response to a tensile load. A second dampener may be coupled to the second strap. The yoke may further comprise a third strap. The third strap and the second strap may be sewn together. The third strap and the second strap may be coupled to the first dampener. The first dampener may be coupled between a first portion of the first strap and a second portion of the first strap. The first portion of the first strap may extend through a first opening in the first dampener and the second portion of the first strap may extend through a second opening in the first dampener. A third strap may be coupled to the first portion of the first strap and the second portion of the first strap. The first dampener may comprise at least one of a central aperture dampener, a semi-circular dampener, a spring dampener, a threaded dampener, or a wraparound dampener.

In various embodiments, a method of making an evacuation assembly is disclosed. A method of making an evacuation assembly may comprise coupling a yoke to an evacuation slide, the first yoke comprising a first strap and a second strap, coupling a first dampener to the first strap, and coupling a second dampener to the second strap.

The method may further comprise coupling the first dampener and the second dampener in series with a releasable restraint. In various embodiments, at least one of the first dampener or the second dampener may comprise an elastic material.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

FIGS. 5A, 5B, and 5C illustrate a restraint arrangement for an evacuation slide, in accordance with various embodiments;

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosures, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface cross hatching lines may be used throughout the figures to denote different parts but not necessarily to denote the same or different materials.

Throughout the present disclosure, like reference numbers denote like elements. Accordingly, elements with like element numbering may be shown in the figures, but may not be necessarily be repeated herein for the sake of clarity.

As used herein, "aft" refers to the direction associated with the tail (i.e., the back end) of an aircraft, or generally, to the direction of exhaust of the gas turbine. As used herein, "forward" refers to the direction associated with the nose (i.e., the front end) of an aircraft, or generally, to the direction of flight or motion.

Evacuation slides according to the present disclosure may extend from an aircraft structure, such as, for example, a fuselage or a wing, to an exit surface in a fully deployed position. During deployment, a plurality of restraints and/or yokes may aid in controlling the inflation process of the slide.

Figure 1:
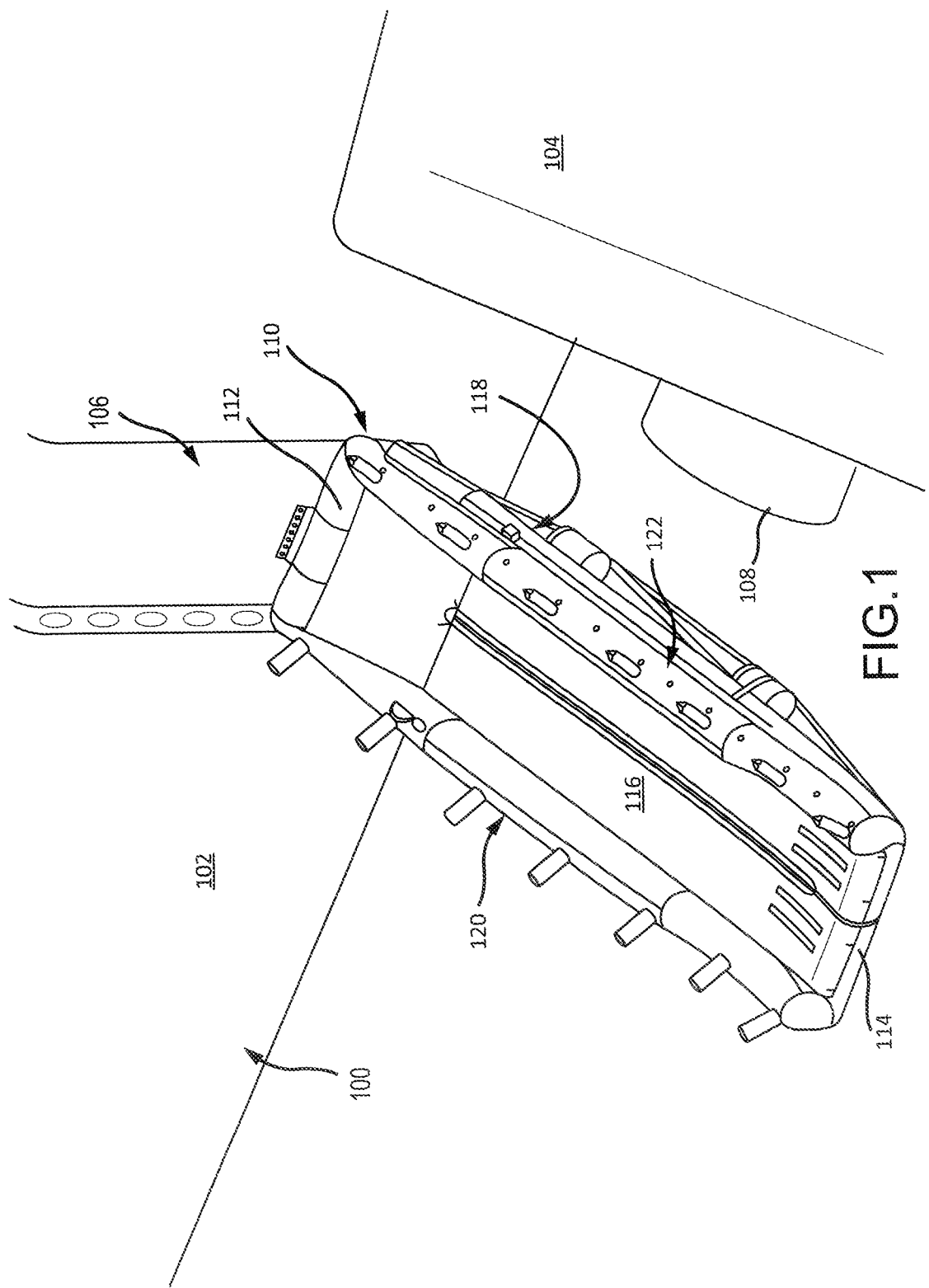
FIG. 1 illustrates a perspective view of an evacuation slide in a deployed position, in accordance with various embodiments.

With reference to FIG. 1, an exemplary aircraft 100 is shown, in accordance with various embodiments. Aircraft 100 may comprise a fuselage 102 with wing 104 fixed to fuselage 102. An engine 108 may be coupled to an underside of wing 104. An emergency exit door 106 (also referred to herein as a door sill) may be located on fuselage 102, forward wing 104 and engine 108. An evacuation slide 110 may be deployed from emergency exit door 106. Evacuation slide 110 may comprise a head end 112 and a toe end 114 opposite head end 112. Head end 112 may be coupled to aircraft 100. Evacuation slide 110 may comprise a sliding surface 116 (also referred to as a top surface) and a rear surface 118 (also referred to as a backside surface) that is opposite sliding surface 116. Evacuation slide 110 may comprise a forward edge 120 that is distal to engine 108 and an aft edge 122 that is proximate to engine 108. Evacuation slide 110 may comprise an inflatable slide. FIG. 1 illustrates evacuation slide 110 in an inflated and/or deployed position. Evacuation slide 110 may comprise a dual lane slide. However, evacuation slide 110 may comprise any number of lanes. Toe end 114 may be configured to contact an exit surface in response to evacuation slide 110 being deployed.

Figure 2:
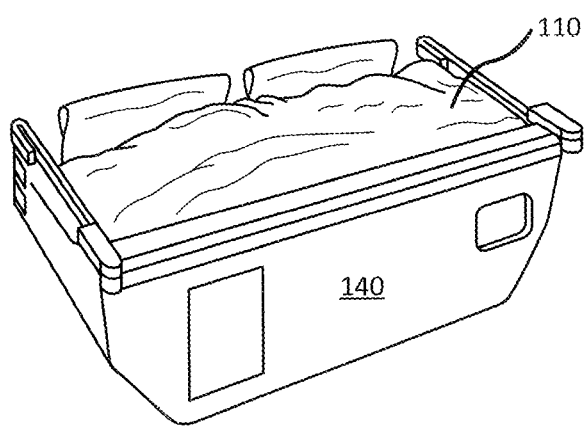
FIG. 2 illustrates a perspective view of an evacuation slide in a stowed position, in accordance with various embodiments.

With reference to FIG. 2, evacuation slide 110 is illustrated in a stowed and/or packed position. In this regard, evacuation slide 110 may be stowed in a packboard 140. In various embodiments, evacuation slide 110 may be folded in the stowed position. In various embodiments, evacuation slide 110 may be deployed from packboard 140 in response to opening an emergency exit door. Packboard 140 may be coupled to an aircraft in an installed position. Packboard 140 includes a blow-out panel which opens in response to deployment of evacuation slide 110, and through which the inflatable slide may exit the packboard. In this regard, evacuation slide 110 may be configured to be deployed from an aircraft.

Figure 3B:
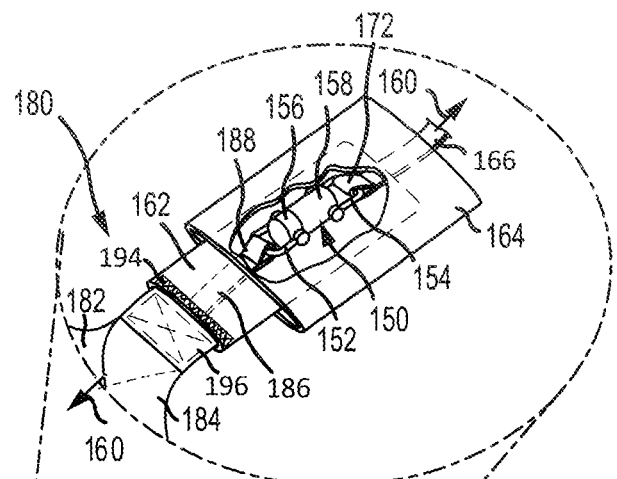
FIGS. 3A and 3B illustrate a deployment of an evacuation slide with a restraint arrangement aiding in retaining the evacuation slide in a folded position, in accordance with various embodiments.
Figure 3A:
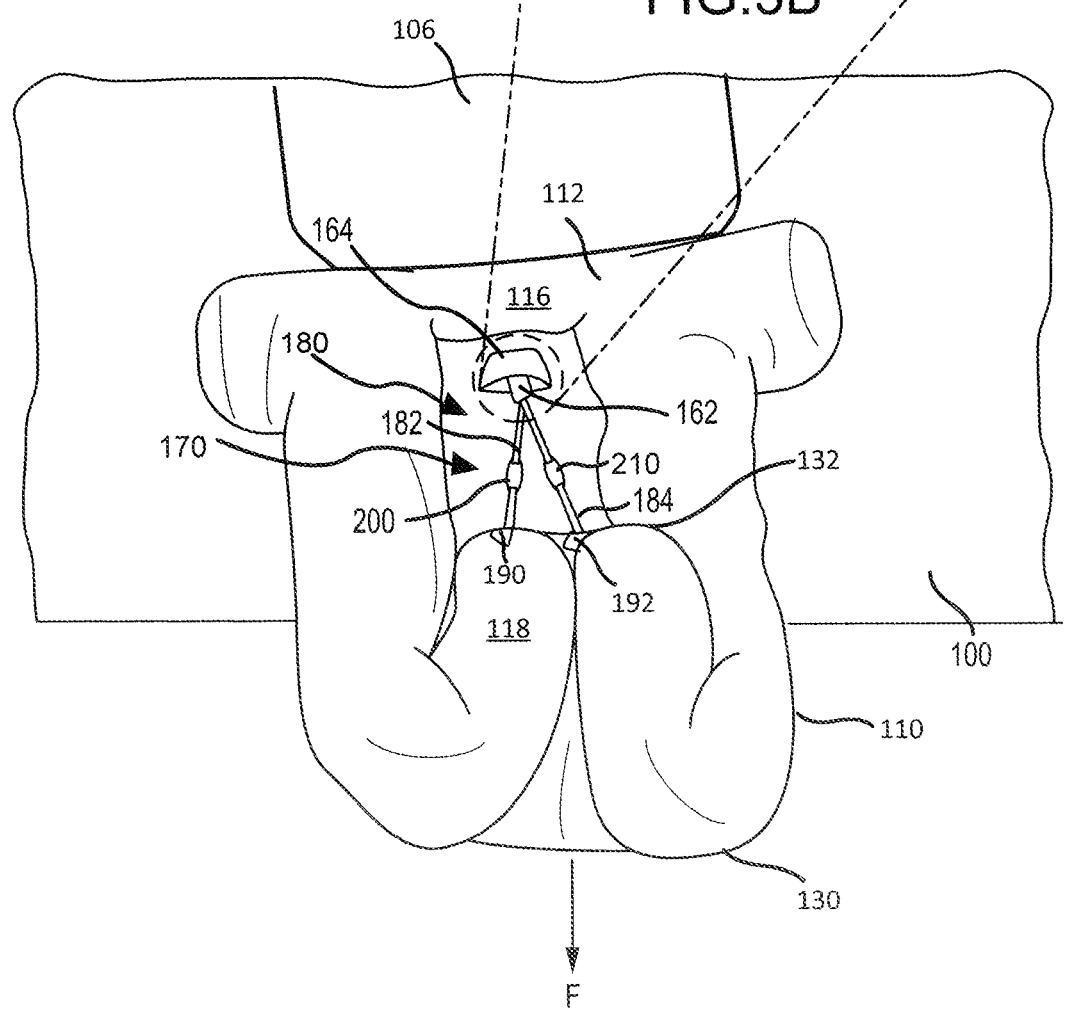

With reference to FIG. 3A and FIG. 3B, a deployment of evacuation slide 110 with a restraint arrangement 170 aiding in retaining evacuation slide 110 in a folded position is illustrated, in accordance with various embodiments. In various embodiments, when evacuation slide 110 is initially deployed, evacuation slide may be in a folded position and may include a plurality of folds, including first fold 130 and second fold 132. A releasable restraint 150 may aid in maintaining first fold 130 and/or second fold 132. Releasable restraint 150 may aid in the staged deployment of evacuation slide 110. Evacuation slide 110 may unfold in response to releasable restraint 150 separating.

In various embodiments, releasable restraint 150 may be configured to separate in response to an internal pressure in evacuation slide 110. For example, a gas cylinder may supply a flow of pressurized fluid to evacuation slide 110 in response to evacuation slide 110 being deployed. Evacuation slide 110 may begin to inflate and an internal pressure of evacuation slide 110 may increase. Releasable restraint 150 may maintain evacuation slide 110 in a folded position until the internal pressure has increased above a predetermined threshold value. Releasable restraint 150 may separate once the internal pressure of evacuation slide 110 has increased above the predetermined threshold value. Evacuation slide 110 may unfold in response to releasable restraint 150 separating. In this regard, evacuation slide 110 may fully deploy in response to releasable restraint 150 separating.

In various embodiments, releasable restraint 150 may include a first shackle 152 and a second shackle 154. Releasable restraint 150, first shackle 152, and/or second shackle 154 may be metallic. In various embodiments, releasable restraint 150 may comprise a shear pin restraint. In this regard, a first portion 156 of releasable restraint 150 may decouple from a second portion 158 of releasable restraint 150 in response to a predetermined tensile force illustrated by arrows 160. A first cover 162 and/or a second cover 164 may surround releasable restraint 150. Second cover 164 may surround at least a portion of first cover 162. First cover 162 and second cover 164 may comprise a fabric. For example, first cover 162 and second cover 164 may comprise nylon, ballistic nylon, polypropylene, polyester, cotton, or other suitable material.

A head-end strap 166 may be coupled to top side surface 116 of evacuation slide 110 and to releasable restraint 150. Head-end strap 166 may be coupled to releasable restraint 150 via second shackle 154. An end 172 of head-end strap 166 may form a loop through which second shackle 154 is located. In various embodiments, head-end strap 166 may comprise a rope, tape, ribbon, webbing, or other suitable strap. In various embodiments, head-end strap 166 may comprise nylon, ballistic nylon, polypropylene, polyester, cotton, or other suitable material.

A yoke 180 may be coupled between backside surface 118 of evacuation slide 110 and releasable restraint 150. Yoke 180 may be coupled to releasable restraint 150 via first shackle 152. Yoke 180 may comprise a first strap 182, a second strap 184, and a restraint attachment portion 186. Restraint attachment portion 186 may be located within first cover 162. First strap 182 and second strap 184 may be coupled to releasable restraint 150 via restraint attachment portion 186. In various embodiments, first strap 182, second strap 184, and/or restraint attachment portion 186 of yoke 180 may comprise a rope, tape, ribbon, webbing, or other suitable strap. In various embodiments, first strap 182, second strap 184, and/or restraint attachment portion 186 of yoke 180 may comprise nylon, ballistic nylon, polypropylene, polyester, cotton, or other suitable material.

An end 188 of restraint attachment portion 186 may form a loop through which first shackle 152 is located. First strap 182, second strap 184, restraint attachment portion 186, and/or first cover 162 may be sewn together at bartack stitch 194. Restraint attachment portion 186 of yoke 180 may extend from first shackle 152 to bartack stitch 194. First strap 182 may be coupled to a first area 190 on backside surface 118 of evacuation slide 110 such that first strap 182 extends from bartack stitch 194 to first area 190 of evacuation slide 110. Second strap 184 of yoke 180 may be coupled to a second area 192 on backside surface 118 of evacuation slide 110, such that second strap 184 extends from bartack stitch 194 to second area 192 of evacuation slide 110. In various embodiments, first strap 182 and second strap 184 may be sewn, or otherwise attached, to one another at box and cross stitch area 196 and then sewn as a single unit to restraint attachment portion 186 and/or first cover 162 at bartack stitch 194.

In various embodiments, restraint arrangement 170 may comprise a first dampener 200 coupled to first strap 182 of yoke 180 and a second dampener 210 coupled to second strap 184 of yoke 180. First dampener 200 and second dampener 210 may comprise an elastically deformable member configured deform in response to a tensile load applied to first strap 182 and second strap 184, respectively. In various embodiments, the tensile load is generated by the dropping of evacuation slide 110 from door sill 106. As discussed in further detail below, first dampener 200 and/or second dampener 210 may comprise any one of a number of dampening structures (e.g., a central aperture dampener, a wraparound dampener, a semi-circular dampener, a threaded dampener, or a spring dampener) configured to mitigate an impulse on releasable restraint 150 from the dropping of evacuation slide 110. In various embodiments, first dampener 200 may be a section of elastic sewn into the webbing of first strap 182, and second dampener 210 may be a section of elastic sewn into the webbing of second strap 184.

In various embodiments, restraint arrangement 170 may be coupled to a primary restraint of evacuation slide 110. In other words, evacuation slide 110 may include a plurality of releasable restraints (similar to releasable restraint 150), which aid in the staged deployment of evacuation slide 110, and yoke 180 of restraint arrangement 170 may be coupled to the first releasable restraint to separate in the staged deployment of evacuation slide 110.

First dampener 200 and second dampener 210 may be coupled in series with releasable restraint 150. First dampener 200 and second dampener 210 may be in operable communication with releasable restraint 150 and may mitigate an impulse applied to releasable restraint 150 during the dropping evacuation slide 110. For example, evacuation slide 110 falling from door sill 106 generates a tensile load which is applied to yoke 180. First dampener 200 and second dampener 210 may elastically deform in response to the tensile load. The deformation of first dampener 200 and second dampener 210 may decrease an impulse experienced by releasable restraint 150, as the deformation of first dampener 200 and second dampener 210 may spread the tensile load over a greater amount of time. Stated another way, deformation of first dampener 200 and second dampener 210 may increase the time it takes for the full magnitude of the tensile force F generated by dropped evacuation slide 110 to be applied to releasable restraint 150. Stated yet another way, if first dampener 200 and second dampener 210 were not present a full magnitude of the tensile force F created by dropped evacuation slide 110 may be applied to releasable restraint 150 immediately upon the dropping of evacuation slide 110.

Figure 4:
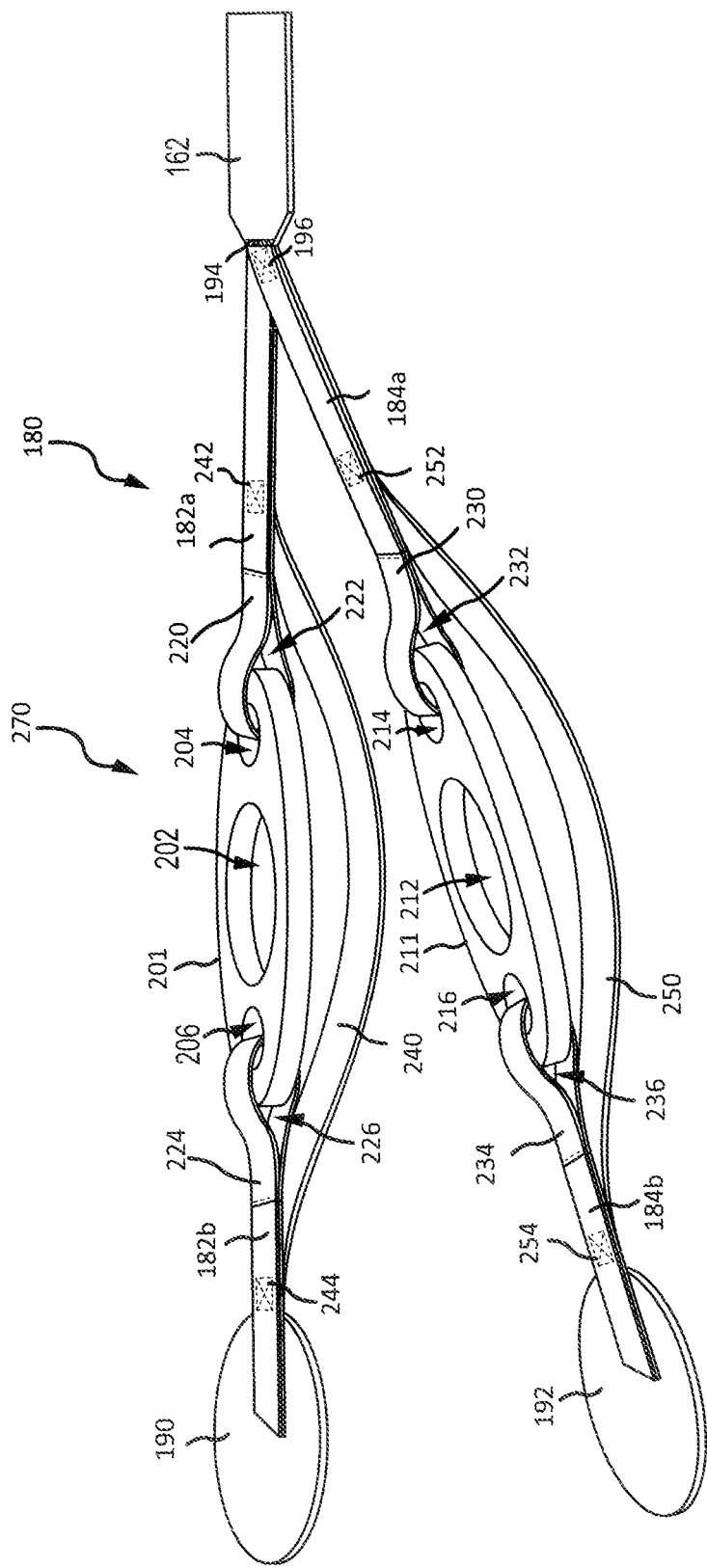
FIG. 4 illustrates a restraint arrangement for an evacuation slide, in accordance with various embodiments.

With reference to FIG. 4, a restraint arrangement 270 is illustrated, in accordance with various embodiments. Restraint arrangement 270 may be similar to restraint arrangement 170 of FIG. 3A. Restraint arrangement 270 may comprise a first central aperture dampener 201. First central aperture dampener 201 may comprise a central opening 202, a first edge opening 204, and a second edge opening 206. Edge openings 204 and 206 may be disposed proximate a perimeter of first central aperture dampener 201. First central aperture dampener 201 may comprise an elastic material. For example, first central aperture dampener 201 may comprise natural or synthetic rubber, silicone, an elastomer, or any other suitably elastic material.

Restraint arrangement 270 may further comprise a second central aperture dampener 211. Second central aperture dampener 211 may include a central opening 212, a first edge opening 214, and a second edge opening 216. Edge openings 214 and 216 may be disposed proximate a perimeter of second central aperture dampener 211. Second central aperture dampener 211 may comprise an elastic material. For example, second central aperture dampener 211 may comprise natural or synthetic rubber, silicone, an elastomer, or any other suitably elastic material.

First central aperture dampener 201 may be coupled between a first portion 182a and a second portion 182b of first strap 182, with monetary reference to FIG. 4. An end 220 of first portion 182a may form a first loop 222 through which first central aperture dampener 201 may be located. In various embodiments, first portion 182a may be looped through first edge opening 204 and sewn to itself. An end 226 of second portion 182b may form a second loop 228 through which first central aperture dampener 201 may be located. In various embodiments, second portion 182b may be looped through second edge opening 206 and sewn to itself.

Second central aperture dampener 211 may be coupled between a first portion 184a and a second portion 184b of second strap 184, with momentary reference to FIG. 4. An end 230 of first portion 184a may form a first loop 232 through which second central aperture dampener 211 may be located. In various embodiments, first portion 184a may be looped through first edge opening 214 and sewn to itself. An end 236 of second portion 184b may form a second loop 238 through which second central aperture dampener 211 may be located. In various embodiments, second portion 184b may be looped through second edge opening 216 and sewn to itself.

A third strap 240 may be coupled between first portion 182a and second portion 182b. In various embodiments, third strap 240 may be sewn to first portion 182a at stitches 242 and sewn to second portion 182b at stitches 244. Third strap 240 may be configured as a limiting strap. For example, third strap may provide a limit to the deformation of first central aperture dampener 201, such that at a deformation limit of first central aperture dampener 201, third strap 240 acts to transfers tensile loads from first portion 182a to second portion 182b. Third strap 240 may also provide a redundancy measure. For example, should first central aperture dampener 201 break prematurely or otherwise become separated from first portion 182a or second portion 182b, second portion 182b and first portion 182a may still be operably connected to one another via third strap 240.

A fourth strap 250 may be coupled between first portion 184a and second portion 184b. In various embodiments, fourth strap 250 may be sewn to first portion 184a at stitches 252 and sewn to second portion 184b at stitches 254. Fourth strap 250 may be configured as a limiting strap. For example, fourth strap may provide a limit to the deformation of second central aperture dampener 211, such that at a deformation limit of second central aperture dampener 211, fourth strap 250 acts to transfers tensile loads from first portion 184a to second portion 184b. Fourth strap 250 may also provide a redundancy measure. For example, should second central aperture dampener 211 break prematurely or otherwise become separated from first portion 184a or second portion 184b, second portion 184b and first portion 184a may still be operably connected to one via fourth strap 250.

With reference to FIG. 3A, FIG. 3B, and FIG. 4, in various embodiments, first dampener 200 of restraint arrangement 170 may comprise first central aperture dampener 201, and second dampener 210 of restraint arrangement 170 may comprise second central aperture dampener 211. First central aperture dampener 201 and second central aperture dampener 211 may be coupled in series with the releasable restraint 150 attached to yoke 180. First central aperture dampener 201 and second central aperture dampener 211 may be in operable communication with releasable restraint 150 to mitigate the impulse applied to releasable restraint 150 upon the dropping evacuation slide 110 from door sill 106. Reducing the impulse on releasable restraint 150 may reduce occurrences of releasable restraint 150 separating prematurely and may increase a deployment precision and reliability of evacuation slide 110.

First central aperture dampener 201 and second central aperture dampener 211 may be configured to stretch and/or deform in response to a tensile force and/or impulse being applied to first strap 182 and second strap 184, respectively. For example, first central aperture dampener 201 and second central aperture dampener 211 may stretch in response to a dropping of evacuation slide 110 from door sill 106. First central aperture dampener 201 and second central aperture dampener 211 may be rated for loads greater than the rating of releasable restraint 150. Stated differently, releasable restraint 150 may be configured to separate at a load which is less than the rated load of first central aperture dampener 201 and second central aperture dampener 211. Stated yet another way, first central aperture dampener 201 and second central aperture dampener 211 may be configured to stretch without breaking before releasable restraint 150 separates.

With reference to FIGS. 5A, 5B, and 5C, a restraint arrangement 300 is illustrated, in accordance with various embodiments. Restraint arrangement 300 may be similar to restraint arrangement 170 in FIG. 3A. In various embodiments, restraint arrangement 300 includes a wraparound dampener 302 coupled to first strap 182. Wraparound dampener 302 may include an elongated unibody member 301 having a first opening 304 located at a first end 306 of wraparound dampener 302 and a second opening 308 located at a second end 310 of wraparound dampener 302 opposite first end 306. First strap 182 of yoke 180 may be disposed through first opening 304, wrapped around unibody member 301, and disposed through second opening 308. Wraparound dampener 302 may comprise an elastic material. For example, wraparound dampener 302 may comprise natural or synthetic rubber, silicone, an elastomer, or any other suitably elastic material. As wraparound dampener 302 stretches in response to an impulse (e.g., a dropping of evacuation slide 110), a distance between the portions of first strap 182 wrapped around wraparound dampener 302 may become greater.

With reference to FIG. 3A, FIG. 3B, and FIG. 5C, in various embodiments, first dampener 200 of restraint arrangement 170 may comprise wraparound dampener 302. Wraparound dampener 302 may be coupled in series with the releasable restraint 150 attached to yoke 180. Wraparound dampener 302 may be in operable communication with releasable restraint 150 to mitigate the impulse applied to releasable restraint 150 upon the dropping evacuation slide 110 from door sill 106. Reducing the impulse on releasable restraint 150 may reduce occurrences of releasable restraint 150 separating prematurely and may increase a deployment precision and reliability of evacuation slide 110. Wraparound dampener 302 may be configured to stretch and/or deform in response to a tensile force and/or impulse being applied to first strap 182; for example, wraparound dampener 302 may stretch in response to a dropping of evacuation slide 110 from door sill 106. Wraparound dampener 302 may be rated for loads greater than the rating of releasable restraint 150. Stated differently, releasable restraint 150 may be configured to separate at a load which is less than the rated load of wraparound dampener 302. Stated yet another way, wraparound dampener 302 may be configured to stretch without breaking before releasable restraint 150 separates. In various embodiments, second dampener 210 of restraint arrangement 170 may comprise a wraparound dampener, similar to wraparound dampener 302.

Figure 6:
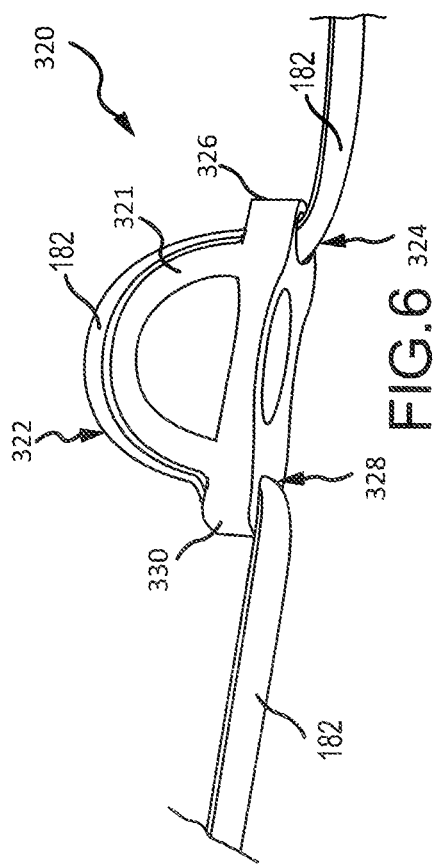

With reference to FIG. 6, a restraint arrangement 320 is illustrated, in accordance with various embodiments. Restraint arrangement 320 may be similar to restraint arrangement 170 in FIG. 3A. In various embodiments, restraint arrangement 320 includes a semi-circular dampener 322 coupled to first strap 182. Semi-circular dampener 322 may include a semi-circular member 321 having a first opening 324 located proximate a first end 326 of semi-circular dampener 322 and a second opening 328 located proximate a second end 330 of semi-circular dampener 322 opposite first end 326. First strap 182 may be disposed through first opening 324, around a portion of the circumference of semi-circular member 321, and through second opening 328. Semi-circular dampener 322 may comprise an elastic material. For example, semi-circular dampener 322 may comprise natural or synthetic rubber, silicone, an elastomer, or any other suitably elastic material.

With reference to FIG. 3A, FIG. 3B, and FIG. 6, in various embodiments, first dampener 200 of restraint arrangement 170 may comprise semi-circular dampener 322. Semi-circular dampener 322 may be coupled in series with the releasable restraint 150 attached to yoke 180. Semi-circular dampener 322 may be in operable communication with releasable restraint 150 to mitigate the impulse applied to releasable restraint 150 upon the dropping evacuation slide 110 from door sill 106. Reducing the impulse on releasable restraint 150 may reduce occurrences of releasable restraint 150 separating prematurely and may increase a deployment precision and reliability of evacuation slide 110. Semi-circular dampener 322 may be configured to stretch and/or deform in response to a tensile force and/or impulse being applied to first strap 182; for example, semi-circular dampener 322 may stretch in response to a dropping of evacuation slide 110 from door sill 106. Semi-circular dampener 322 may be rated for loads greater than the rating of releasable restraint 150. Stated differently, releasable restraint 150 may be configured to separate at a load which is less than the rated load of semi-circular dampener 322. Stated yet another way, semi-circular dampener 322 may be configured to stretch without breaking before releasable restraint 150 separates. In various embodiments, second dampener 210 of restraint arrangement 170 may comprise a semi-circular dampener, similar to semi-circular dampener 322.

Figure 7:
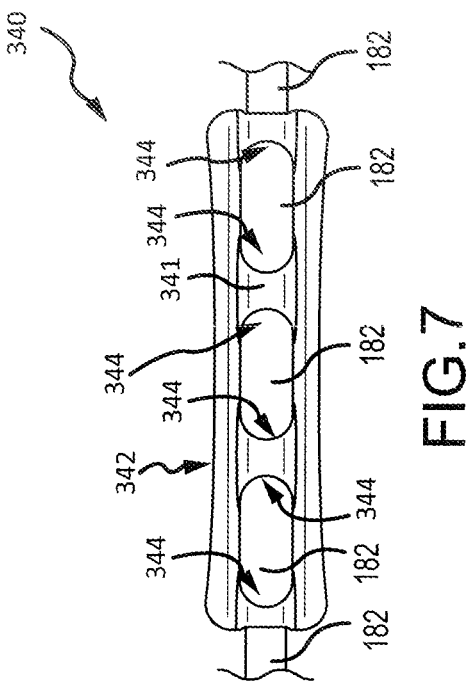
FIGS. 6, 7, 8, and 9 illustrate restraint arrangements for an evacuation slide, in accordance with various embodiments.

With reference to FIG. 7, a restraint arrangement 340 is illustrated, in accordance with various embodiments. In various embodiments, restraint arrangement 340 may be similar to restraint arrangement 170 in FIG. 3A. In various embodiments, restraint arrangement 340 includes a threaded dampener 342 coupled to first strap 182. Threaded dampener 342 may include a unibody member 341 having a plurality of openings 344 formed along a length of unibody member 341. First strap 182 may be threaded through the plurality of openings 344. Threaded dampener 342 may comprise an elastic material. For example, threaded dampener 342 may comprise natural or synthetic rubber, silicone, an elastomer, or any other suitably elastic material.

With reference to FIG. 3A, FIG. 3B, and FIG. 7, in various embodiments, first dampener 200 of restraint arrangement 170 may comprise threaded dampener 342. Threaded dampener 342 may be coupled in series with the releasable restraint 150 attached to yoke 180. Threaded dampener 342 may be in operable communication with releasable restraint 150 to mitigate the impulse applied to releasable restraint 150 upon the dropping evacuation slide 110 from door sill 106. Reducing the impulse on releasable restraint 150 may reduce occurrences of releasable restraint 150 separating prematurely and may increase a deployment precision and reliability of evacuation slide 110. Threaded dampener 342 may be configured to stretch and/or deform in response to a tensile force and/or impulse being applied to first strap 182; for example, threaded dampener 342 may stretch in response to a dropping of evacuation slide 110 from door sill 106. Threaded dampener 342 may be rated for loads greater than the rating of releasable restraint 150. Stated differently, releasable restraint 150 may be configured to separate at a load which is less than the rated load of threaded dampener 342. Stated yet another way, threaded dampener 342 may be configured to stretch without breaking before releasable restraint 150 separates. In various embodiments, second dampener 210 of restraint arrangement 170 may comprise a threaded dampener, similar to threaded dampener 342.

Figure 8:
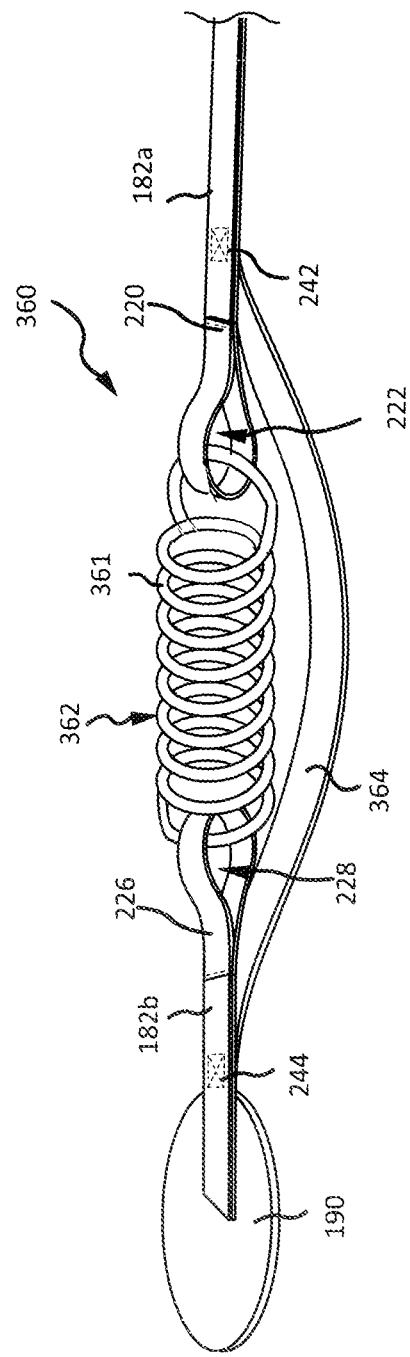

With reference to FIG. 8, a restraint arrangement 360 is illustrated, in accordance with various embodiments. Restraint arrangement 360 may be similar to restraint arrangement 170 in FIG. 3A. In various embodiments, restraint arrangement 360 includes a spring dampener 362 coupled to first strap 182. Spring dampener 362 may be coupled between first portion 182a and second portion 182b of first strap 182. End 220 of first portion 182a may form first loop 222 through which spring dampener 362 may be located. In various embodiments, first portion 182a may be looped through spring dampener 362 and sewn to itself. End 226 of second portion 182b may form second loop 228 though which spring dampener 362 may be located. In various embodiments, second portion 182b may be looped through spring dampener 362 and sewn to itself.

Spring dampener 362 may comprise a compressible coil member 361. Compressible coil member 361 may be configured to regain its original shape after being compressed or extended. Spring dampener 362 may comprise an elastic material. For example, spring dampener 362 may comprise natural or synthetic rubber, silicone, an elastomer, or any other suitably elastic material. In various embodiments, spring dampener 362 may comprise a metal.

A third strap 364 may be coupled between first portion 182a and second portion 182b. In various embodiments, third strap 364 may be sewn to first portion 182a at stitches 242 and sewn to second portion 182b at stitches 244. Third strap 364 may be configured as a limiting strap. For example, third strap 364 may provide a limit to the deformation of spring dampener 362, such that at a deformation limit of spring dampener 362, third strap 364 acts to transfer tensile loads from first portion 182a to second portion 182b. Third strap 364 may also provide a redundancy measure. For example, should spring dampener 362 break prematurely or otherwise become separated from first portion 182a or second portion 182b, second portion 182b and first portion 182a may still be operably connected to one another via third strap 364.

With reference to FIG. 3A, FIG. 3B, and FIG. 8, in various embodiments, first dampener 200 of restraint arrangement 170 may comprise spring dampener 362. Spring dampener 362 may be coupled in series with the releasable restraint 150 attached to yoke 180. Spring dampener 362 may be in operable communication with releasable restraint 150 to mitigate the impulse applied to releasable restraint 150 upon the dropping evacuation slide 110 from door sill 106. Reducing the impulse on releasable restraint 150 may reduce occurrences of releasable restraint 150 separating prematurely, and increase a deployment precision and reliability of evacuation slide 110. Spring dampener 362 may be configured to stretch and/or deform in response to a tensile force and/or impulse being applied to first strap 182; for example, spring dampener 362 may stretch in response to a dropping of evacuation slide 110 from door sill 106. Spring dampener 362 may be rated for loads greater than the rating of releasable restraint 150. Stated differently, releasable restraint 150 may be configured to separate at a load which is less than the rated load of spring dampener 362. Stated yet another way, threaded dampener 342 may be configured to stretch without breaking before releasable restraint 150 separates. In various embodiments, second dampener 210 of restraint arrangement 170 may comprise a spring dampener, similar to spring dampener 362.

Figure 9:
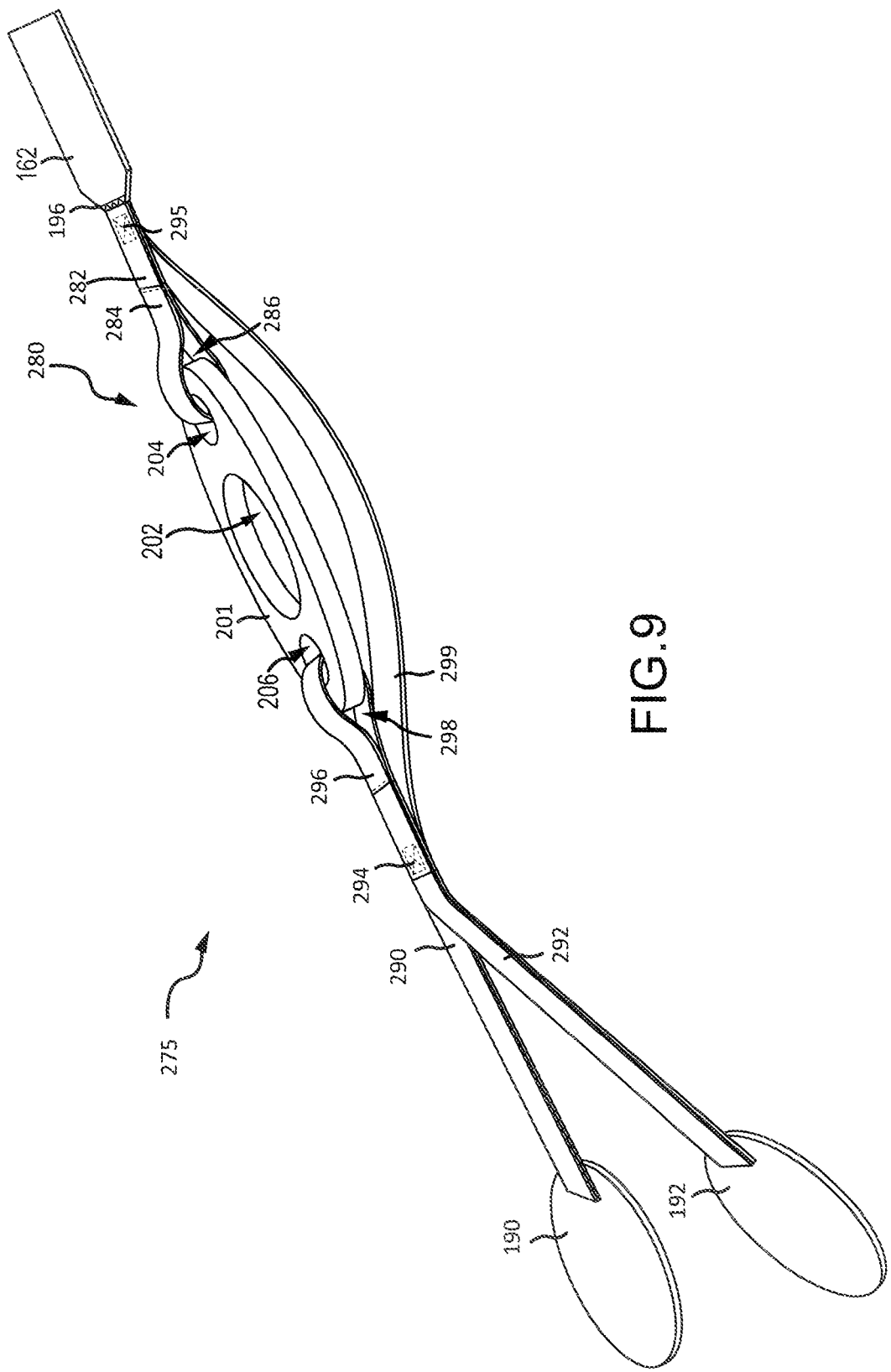

With reference to FIG. 9, a restraint arrangement 275 is illustrated, in accordance with various embodiments. Restraint arrangement 275 may comprise a yoke 280. Yoke 280 may include a first strap 282 coupled to first central aperture dampener 201 and to first cover 162. First strap 282 may be coupled to first cover 162 via bartack stitching 196. An end 284 of first strap 282 may form a first loop 286, which may be disposed around first central aperture dampener 201. In various embodiments, first strap 282 may be looped through first edge opening 204 and sewn to itself.

Yoke 280 may include a second strap 290 and a third strap 292. Second strap 290 may be coupled to first area 190 on backside surface 118 of evacuation slide 110, with momentary reference to FIG. 3A. Third strap 292 may be coupled to second area 192 on backside surface 118 of evacuation slide 110, with momentary reference to FIG. 3A. Second strap 290 and third strap 292 may be sewn together at stitches 294 and coupled to first central aperture dampener 201 as a single unit. For example, an end 296 of sewn together second strap 290 and third strap 292 may form a second loop 298, which may be disposed around first central aperture dampener 201. In various embodiments, the sewn together portion of second strap 290 and third strap 292 may be looped through second edge opening 206 of first central aperture dampener 201 and sewn to itself.

A fourth strap 299 may be coupled between first strap 282 and sewn together second strap 290 and third strap 292. In various embodiments, fourth strap 299 may be sewn to first strap 282 at stitches 295 and sewn to second strap 290 and third strap 292 at stitches 294. Fourth strap 299 may be configured as a limiting strap. For example, fourth strap 299 may provide a limit to the deformation of first central aperture dampener 201, such that at a deformation limit of first central aperture dampener 201, fourth strap 299 acts to transfer tensile loads from first strap 282 to second strap 290 and third strap 292. Fourth strap 299 may also provide a redundancy measure. For example, should first central aperture dampener 201 break prematurely or otherwise become separated from first strap 282 or from sewn together second strap 290 and third strap 292, first strap 282 may still be operably connected to second strap 290 and third strap 292 via fourth strap 299.

With reference to FIG. 3A, FIG. 3B, and FIG. 9, in various embodiments, restraint arrangement 275 may couple evacuation slide 110 to releasable restraint 150 within first cover 162. First central aperture dampener 201 of restraint arrangement 275 may be coupled in series with the releasable restraint 150. First central aperture dampener 201 of restraint arrangement 275 may be in operable communication with releasable restraint 150 to mitigate the impulse applied to releasable restraint 150 upon the dropping evacuation slide 110 from door sill 106. Reducing the impulse on releasable restraint 150 may reduce occurrences of releasable restraint 150 separating prematurely and may increase a deployment precision and reliability of evacuation slide 110. First central aperture dampener 201 of restraint arrangement 275 may be configured to stretch and/or deform in response to a tensile force and/or impulse being applied to yoke 280; for example, first central aperture dampener 201 of restraint arrangement 275 may stretch in response to a dropping of evacuation slide 110 from door sill 106. First central aperture dampener 201 of restraint arrangement 275 may be rated for loads greater than the rating of releasable restraint 150. Stated differently, releasable restraint 150 may be configured to separate at a load which is less than the rated load of first central aperture dampener 201 of restraint arrangement 275. Stated yet another way, first central aperture dampener 201 of restraint arrangement 275 may be configured to stretch without breaking before releasable restraint 150 separates.

In various embodiments, a wraparound dampener, a threaded dampener, a semi-circular dampener, or a spring dampener may replace first central aperture dampener 201 in restraint arrangement 275. Stated another way, a wraparound dampener, a threaded dampener, a semi-circular dampener, or a spring dampener may be coupled between first strap 282 and sewn together second strap 290 and third strap 292.

Figure 10:
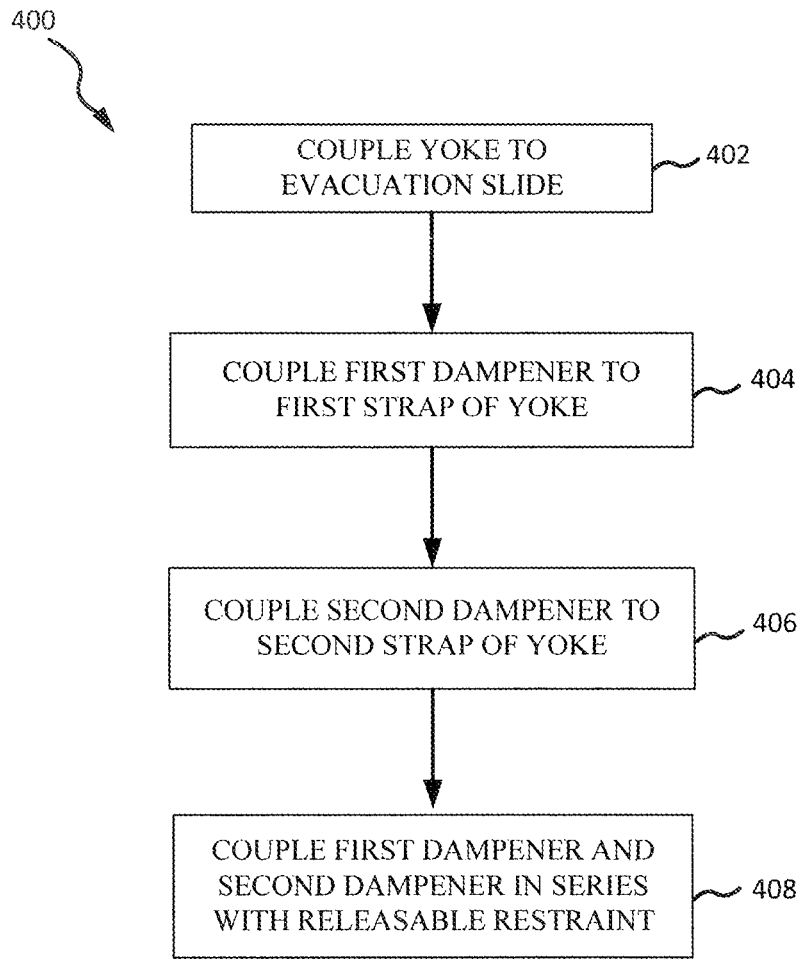
FIG. 10 illustrates a method of making an evacuation assembly, in accordance with various embodiments.

With reference to FIG. 10, a method 400 of making an evacuation assembly is provided, in accordance with various embodiments. The method 400 comprises coupling a yoke to an evacuation slide (step 402), coupling a first dampener to a first strap of the yoke (step 404), and coupling a second dampener to a second strap of the yoke (step 406). Method 400 may further comprise coupling the first dampener and the second dampener in series with a releasable restraint (step 408).

In various embodiments, with combined reference to FIG. 3B, FIG. 4, and FIG. 5, step 402 may include coupling yoke 180 to evacuation slide 110. Step 404 may include coupling first dampener 200 to first strap 182. Step 406 may include coupling second dampener 210 to second strap 184. Step 408 may include coupling first dampener 200 and second dampener 210 in series with releasable restraint 150.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A restraint arrangement for an inflatable slide, comprising:
    a releasable restraint; and
    a yoke coupled to the releasable restraint, the yoke comprising:
        a first strap coupled to the releasable restraint;
        a dampener coupled to the first strap;
        a second strap; and
        a third strap attached to the second strap, wherein the second strap and the third strap are attached to the dampener as a single unit and wherein the dampener is located through a second loop formed by the second strap and the third strap.

2. The restraint arrangement of claim 1, wherein the dampener comprises an elastic material configured to deform in response to a tensile load.

3. The restraint arrangement of claim 2, wherein the second strap is attached to a first area of the inflatable slide, and wherein the third strap is attached to a second area of the inflatable slide.

4. The restraint arrangement of claim 1, further comprising a fourth strap attached to the first strap and at least one of the second strap or the third strap.

5. The restraint arrangement of claim 1, wherein the dampener comprises a central aperture.

6. The restraint arrangement of claim 1, wherein the dampener comprises a spring dampener.

7. A yoke for an evacuation system, comprising:
    a first strap;
    a dampener located through a first loop formed by the first strap;
    a second strap; and
    a third strap attached to the second strap, wherein the second strap and the third strap are attached to the dampener as a single unit and wherein the dampener is located through a second loop formed by the second strap and the third strap.

8. The yoke of claim 7, wherein the dampener comprises an elastic material.

9. The yoke of claim 7, further comprising a fourth strap attached to the first strap and at least one of the second strap or the third strap.

* * * * *